UNITED STATES PATENT OFFICE 2,312,437

PLASTIC MASSES FROM POLYVINYL COMPOUNDS

Hans Orth, Troisdorf, Germany; vested in the Alien Property Custodian

No Drawing. Application August 11, 1939, Serial No. 289,626. In Germany August 15, 1938

3 Claims. (Cl. 260—36)

Numerous organic substances of low volatility have been proposed as plasticizers for polyvinyl compounds. These however are often not capable of satisfying the ever increasing technical demands made on plastic masses from polyvinyl compounds; they have insufficient resistance to cold or they incline to sweat owing to insufficient compatibility or they reduce the electrical insulating properties of the polyvinyl compounds.

It has been found that plastic masses from polyvinyl compounds do not present these faults and have particularly good properties if they contain as plasticizers, the ethers of low volatility of 1- or 2-hydroxylmethyl-5,6,7,8-tetrahydronaphthalenes which term includes the alkyl- alkoxy-or halogen substitution products thereof, in particular those in which the alkyl-, alkoxy- or halogen residue is combined in the aromatic nucleus. These ethers can easily be prepared in known manner by reacting the corresponding 1- or 2-chlormethyl-5,6,7,8-tetrahydronaphthalene with the alkali compounds of hydroxyl-compounds.

Suitable hydroxyl compounds for this purpose are for example aliphatic, cyclo-aliphatic and aliphatic-aromatic alcohols with as high boiling point as possible, such as cetyl alcohol, tetrahydrofurfuryl alcohol, cyclohexanols, benzyl alcohol, phenyl-ethyl alcohol, also phenols for example phenol itself, cresol, naphthol, tetrahydronaphthol and oxymethyl-tetrahydro-naphthalene. The alcohols can also contain substituents for example alkoxy- or halogen residues.

Suitable polyvinyl compounds which can be plasticized with the said ethers, are polymerisation products of vinyl chloride, vinyl esters, vinyl ethers, acryl- or methacryl-compounds, and also mixtures of the stated compounds, further conversion products from vinyl compounds, for example chlorinated polyvinyl chloride or condensation products of polyvinylalcohol or polyvinyl esters and aldehydes or cyclic ketones.

The said ethers have an excellent plasticizing effect and good compatibility with the polyvinyl compounds. The plastic masses of polyvinyl compounds and the said ethers are characterized by outstanding resistance to cold, good water resistance and very low volatility and are almost throughout completely odourless. Further they are characterized by good electric properties, which are moreover maintained during exposure to damp, so that the masses are particularly suitable for insulating and covering cables.

*Examples*

(1) A mixture consisting of 63 parts of polyvinylchloride and 37 parts of 2-phenoxymethyl-5,6,7,8-tetrahydronaphthalene of the following formula

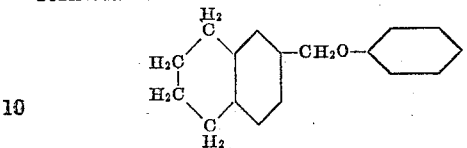

(of B. P.$_{p2.5\ mm}$=182–183° C.) is rolled for about 15 minutes at 160–165° C. and the skin adhering to the rollers then pressed. The clear, entirely odourless foil presents the following values:

Cold resistance (tested by sharp bending of 1 mm. foil through 180°) _____ —14 to —15° C.
Heat resistance (by the Vicat test using a needle of 2 mm. diameter and a weight of 500 grams) _____ 75 to 80° C.
Tearing strength _____ 163 kg. per sq. cm.
Extension _____ 281%
Surface resistance (1 mm. foil) _____ approximately 3 million megohms
Internal resistance (1 mm. foil) _____ approximately 2 million megohms Insulation resistance of a cable at 1000 volts, said cable having a material extruded thereon to a radial thickness of 1.5 mm.

(a) Direct measurement 655 megohms per kilometer.
(b) Measurement after 24 hours immersion in water, about 355 megohms per kilometer.

(2) 70 parts of a mixed polymer of vinylchloride and acrylicacid-methylester are rolled for about 30 minutes at 120° C. with 30 parts of the above mentioned 2-phenoxymethyl-5,6,7,8-tetrahydronaphthalene and the skin adhering to the rollers then pressed. The nearly clear, entirely odourless foil presents the following values.

Cold resistance (1 mm. foil) __ —8 to —10° C.
Heat resistance (Vicar test) __ About 50° C.
Tearing strength _____ 215 kg. per sq. cm.
Extension _____ 239%
Surface resistance (1 mm. foil) _____ Infinite
Internal resistance (1 mm. foil) _____ Infinite Insulation resistance of a cable having the material extruded on (φ 1.55 mm.) at 1000 volts:
  (a) Direct measurement 2500 megohms per kilometer
  (b) Measurement after 24 hours immersion in water 1070 megohms per kilometer.

(3) A mixture consisting of 70 parts of polyvinylchloride and 30 parts of 2'-benzylether of 2-methyl-5,6,7,8-tetrahydronaphthalene of the following formula

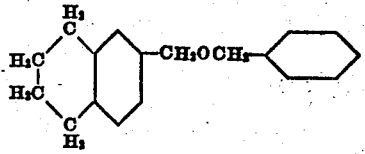

(of B. P.p12mm.=189 to 191° C.) are, as described in greater detail in Example 1, rolled and finally pressed. The clear practically odourless foil has the following values:

Cold resistance (1 mm. foil) __ −15 to −18° C.
Heat resistance (Vicat test) _ 87 to 88° C.
Tearing strength _____ 192 kg. per sq. cm.
Extension _____ 228%
Surface resistance (1 mm. foil) _____ 1 million megohms
Internal resistance (1 mm. foil) _____ About 1.5 million megohms Insulating resistance of an extruded cable (φ 1.5 mm.) at 1000 volts:
  (a) Direct measurement about 800 megohms.
  (b) Measurement after 24 hours immersion in water about 570 megohms.

(4) A mixture consisting of 65 parts of polyvinylchloride and 35 parts of the 2'-phenyl-ethyl ether of 2-methyl 5,6,7,8-tetrahydronaphthalene of the following formula

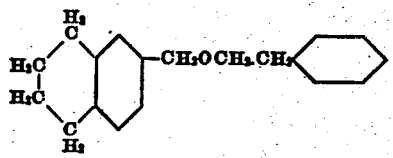

(of B. P.p3.5mm.=201–202° C.) is as described above rolled and the skin adhering to the rollers finally pressed. The clear foil having only a very slight aromatic odour, when tested shows the following values:

Cold resistance (1 mm. foil) _ About −30°
Heat resistance (Vicat test) _ 80° C.
Tearing strength _____ 167 kg. per sq. cm.
Extension _____ 257%.
Surface resistance (1 mm. foil) _____ Greater than 750000 megohms.
Internal resistance (1 mm. foil) _____ Greater than 3 million megohms.

Insulation resistance of an extruded cable (φ1.5 mm. at 1000 volts:
  (a) Direct measurement about 430 megohms.
  (b) Measurement after 24 hours immersion in water about 70 megohms.

(5) A mixture consisting of 65 parts of polyvinyl chloride, 20 parts of 2-phenoxymethyl-5,6,7,8-tetrahydronaphthalene, and 15 parts of 2'-cyclohexyl ether of 2-methyl-5,6,7,8-tetrahydronaphthalene of the following formula

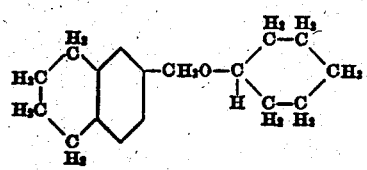

(of B. P.p4mm.=185 to 187° C.) are rolled as usual and the roller skin then pressed. The clear, entirely odourless foil shows the following values:

Cold resistance beyond_____ −20° C.
Heat resistance (Vicat test) _____ 71° C.
Tearing strength _____ 180 kg. per sq. cm.
Extension _____ 284%
Surface resistance (1 mm. foil) _____ Greater than 1 million megohms.
Internal resistance (1 mm. foil) _____ Greater than 1 million megohms.

(6) 65 parts of the acetate of polyvinyl alcohol and iso-butyric-aldehyde are rolled at about 110–115° C. with 35 parts of 2-methyl-5,6,7,8-tetrahydronaphthalene-2-phenyl-ethylether. Foils pressed from the roller skin are completely clear, very supple, adhere well to glass and show a cold resistance down to −20° C.

(7) A mixture consisting of 45 parts of polyvinyl-carbazol and 55 parts of the 2'-(tetrahydro-α-furfuryl ether) of 2-methyl-5,6,7,8-tetrahydronaphthalene of the following formula

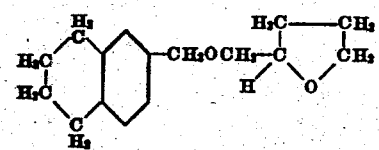

(of B. P.p4mm.=173–176° C.) is rolled for about 1 hour at 160° and the roller skin then pressed at 160° C. into foil (1 mm.). The foils so obtained are almost clear with a slight yellow coloration, very supple and resist cold down to −15° C.

I declare that what I claim is:
1. Plastic masses comprising polyvinyl compounds and ethers of low volatility selected from the group consisting of ethers of 1- and 2-hydroxymethyl-5,6,7,8-tetrahydronaphthalenes.
2. Plastic masses comprising a polyvinyl chloride compound plasticized with an ether of low volatility, selected from the group consisting of ethers of 1- and 2-hydroxymethyl-5,6,7,8-tetrahydronaphthalenes.
3. Plastic masses comprising polyvinyl chloride compounds plasticized with an ether of 2-hydroxy-methyl-5,6,7,8-tetrahydronaphthalene, said ether being of low volatility.

HANS ORTH.